(12) United States Patent
Matsuda et al.

(10) Patent No.: US 8,832,496 B2
(45) Date of Patent: Sep. 9, 2014

(54) INFORMATION MANAGING COMPUTER PRODUCT, APPARATUS, AND METHOD

(75) Inventors: Yuichi Matsuda, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 13/005,157

(22) Filed: Jan. 12, 2011

(65) Prior Publication Data

US 2011/0184991 A1    Jul. 28, 2011

(30) Foreign Application Priority Data

Jan. 26, 2010    (JP) ................. 2010-014853

(51) Int. Cl.
*G06F 11/00* (2006.01)
*H04L 12/24* (2006.01)
*G06F 11/07* (2006.01)

(52) U.S. Cl.
CPC ............ *H04L 41/069* (2013.01); *G06F 11/079* (2013.01)
USPC ........................................................ 714/25

(58) Field of Classification Search
CPC ........................ G06F 11/079; H04L 41/069
USPC ........................................... 707/792; 714/25
See application file for complete search history.

(56) References Cited

U.S. PATENT DOCUMENTS

2005/0146426 A1* 7/2005 Pereira et al. ............... 340/506
2005/0188240 A1* 8/2005 Murphy et al. .................. 714/4
2006/0010337 A1* 1/2006 Suzuki .............................. 714/4

FOREIGN PATENT DOCUMENTS

JP          8-137810 A    5/1996
JP          10-275098 A   10/1998

* cited by examiner

*Primary Examiner* — Jensen Hu
(74) *Attorney, Agent, or Firm* — Fujitsu Patent Center

(57) ABSTRACT

A computer-readable non-transitory recording medium storing therein an information managing program causing a computer to execute extracting from among events that have occurred at objects under management and having dependence relations, combinations of a first event that has occurred at a source-of-dependence object and a second event that has occurred at a dependent object dependent on the source-of-dependence object; judging for each extracted combination, whether a dependence relation exists between the first event and the second event, by using the difference between the time of occurrence of the first event and that of the second event; determining from among the events and based on a judgment result obtained at the judging, an event that has occurred at an object that is a source-of-dependence object but not a dependent object, to be an event to be stored; and storing to a database, information related to the event to be stored.

9 Claims, 15 Drawing Sheets

| NUMBER | OBJECT UNDER MANAGEMENT | | |
| --- | --- | --- | --- |
| | CPU | VM | BUSINESS PROCESS |
| 1 | CPU#1 | VM#1 | BUSINESS X_Web |
| 2 | CPU#1 | VM#2 | BUSINESS X_AP |
| 3 | CPU#2 | VM#3 | BUSINESS X_DB |
| 4 | CPU#1 | VM#4 | BUSINESS Y_Web |
| 5 | CPU#1 | VM#5 | BUSINESS Y_AP |
| 6 | CPU#2 | VM#6 | BUSINESS Y_DB |
| ... | ... | ... | ... |

FIG.2

| NUMBER | TIME STAMP | EVENT KIND | OCCURRENCE POINT | ALARM TYPE | BACKUP |
|---|---|---|---|---|---|
| 201 | 202 | 203 | 204 | 205 | 206 |

FIG.5
| NUMBER | OBJECT UNDER MANAGEMENT | | |
|---|---|---|---|
| | CPU | VM | BUSINESS PROCESS |
| 1 | CPU#1 | VM#1 | BUSINESS X_Web |
| 2 | CPU#1 | VM#2 | BUSINESS X_AP |
| 3 | CPU#2 | VM#3 | BUSINESS X_DB |
| 4 | CPU#1 | VM#4 | BUSINESS Y_Web |
| 5 | CPU#1 | VM#5 | BUSINESS Y_AP |
| 6 | CPU#2 | VM#6 | BUSINESS Y_DB |
| ... | ... | ... | ... |
FIG.6
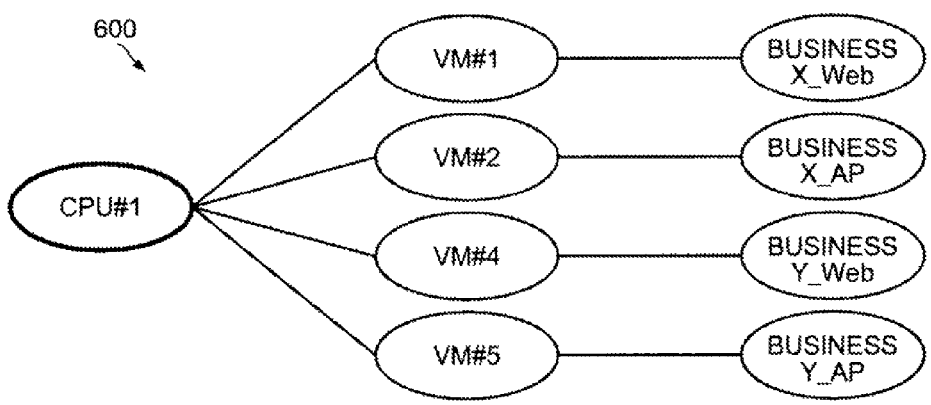
FIG.7
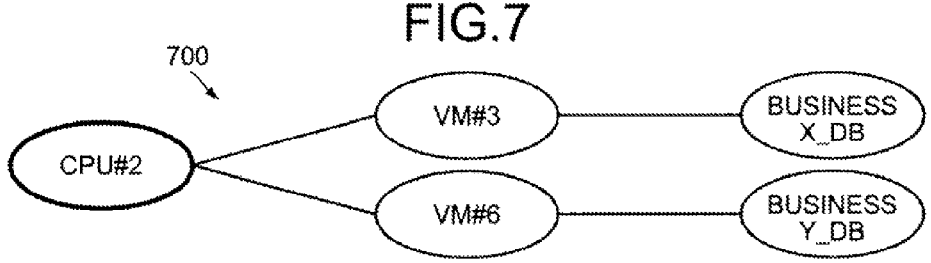

| NUMBER | TIME STAMP | EVENT TYPE | OCCURRENCE POINT | ALARM TYPE | BACKUP |
|---|---|---|---|---|---|
| 0005 | 2009/12/01/17:46 | 0 | CPU#2 | 1003 | ... |
| 0029 | 2009/12/02/09:02 | 1 | VM#1 | 2010 | ... |
| ⋮ | ⋮ | ⋮ | ⋮ | ⋮ | ⋮ |

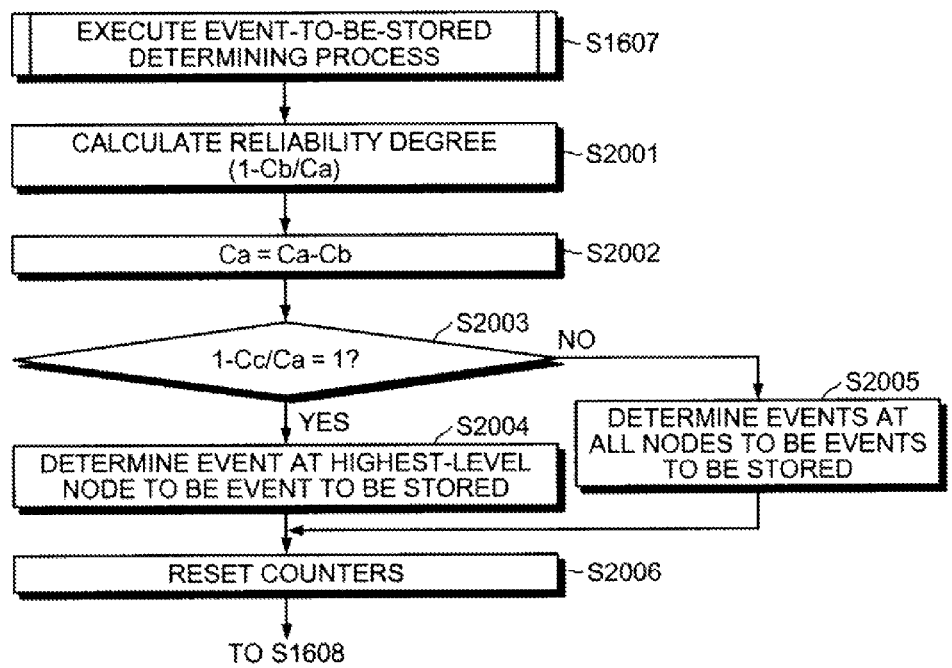

INFORMATION MANAGING COMPUTER PRODUCT, APPARATUS, AND METHOD

CROSS REFERENCE TO RELATED APPLICATIONS

This application is based upon and claims the benefit of priority of the prior Japanese Patent Application No. 2010-014853, filed on Jan. 26, 2010, the entire contents of which are incorporated herein by reference.

FIELD

The embodiments discussed herein are related to information management.

BACKGROUND

A conventional technique such as that disclosed in Japanese Laid-Open Patent Publication No. H8-137810 involves collecting various types of information concerning a network, including fault information; integrating and managing the information; and creating integration information by correlating the information, in a system that executes centralized management of a distributed computer environment. Japanese Laid-Open Patent Publication No. H10-275098 discloses a technique of determining the degree of importance of log information collected, storing log information having a high degree of importance to a file, editing the information having a low degree of importance, and storing the edited information as a statistic information log to another file.

Nonetheless, in the conventional techniques, the degree of importance must be manually determined because the criteria for determining the degree of importance are unknown. Therefore, a problem arises in that it is difficult to identify among the log information having a high degree of importance, the log information that is the origin of fault. Therefore, information that is the origin of a chain of faults, as well as any information whose degree of importance is high, is stored. Therefore, another problem arises in that the amount of information to be stored is still large and resources become insufficient.

SUMMARY

It is an object in one aspect of the embodiments to at least solve the above problems in the conventional technologies.

According to an aspect of an embodiment, a computer-readable non-transitory recording medium stores therein an information managing program that causes a computer to execute a process including extracting from a group of events that have occurred at a group of objects under management and having dependence relations, combinations of a first event that has occurred at a source-of-dependence object and a second event that has occurred at a dependent object that is dependent on the source-of-dependence object; judging for each extracted combination, whether a dependence relation exists between the first event and the second event, by using the difference between the time of occurrence of the first event and that of the second event; determining from among the group of events and based on a judgment result obtained at the judging, an event that has occurred at an object that is a source-of-dependence object but not a dependent object, to be an event that is to be stored; and storing to a database, information related to the event to be stored.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory diagram of an example of the structure of data that is from an object under management and concerns an event that occurs.

FIG. 5 is an explanatory diagram of an example of the contents of a process allocation table.

FIG. 6 depicts dependence relation information acquired when a CPU#1 is the origin of a fault.

FIG. 7 depicts dependence relation information acquired when a CPU#2 is the origin of a fault.

FIG. 20 is a third flowchart of the event-to-be-stored determining process (step S1607) depicted in FIG. 16.

DESCRIPTION OF EMBODIMENTS

Preferred embodiments of the present invention will be explained with reference to the accompanying drawings.

Figure 1:
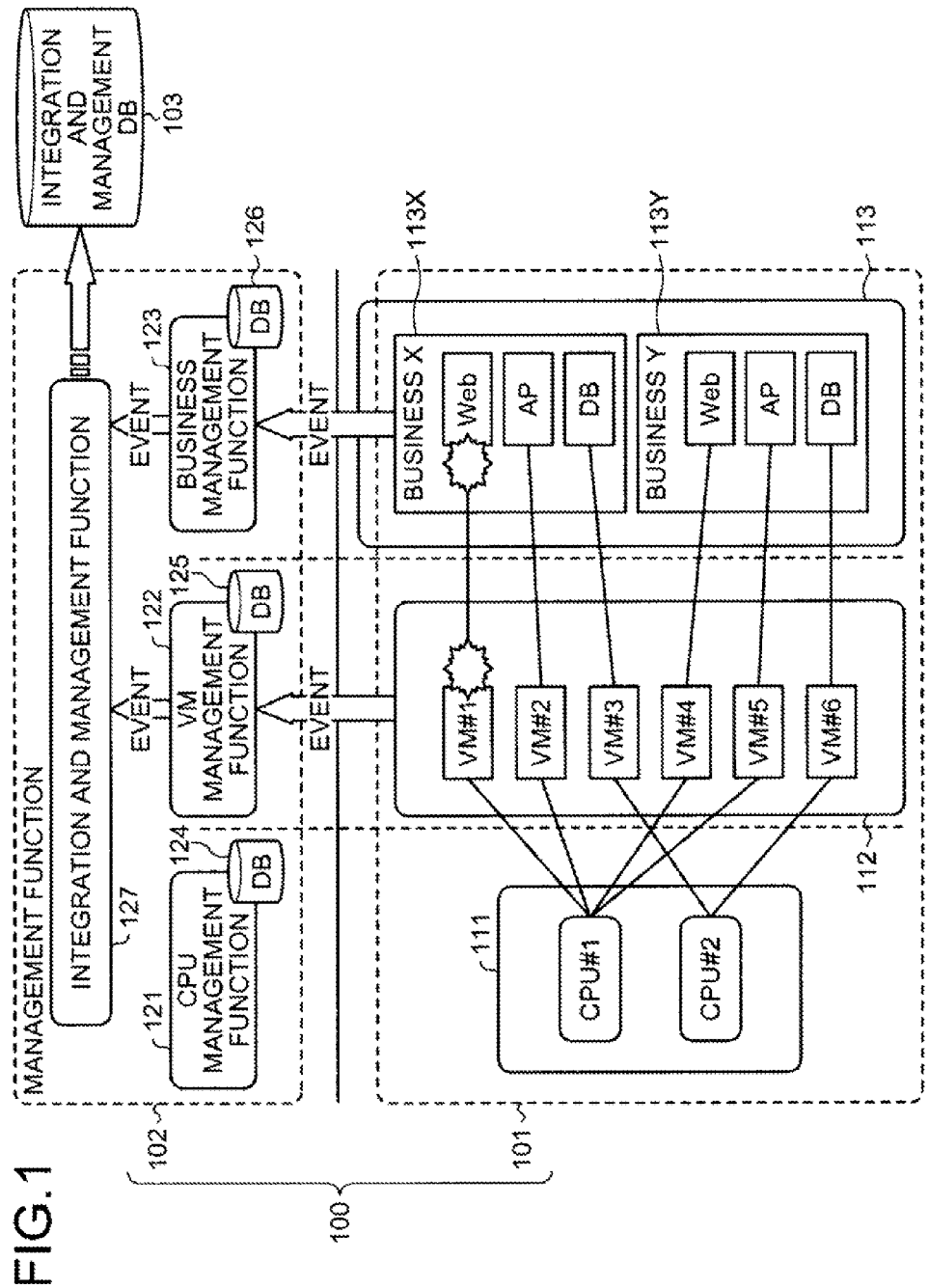
FIG. 1 is an explanatory diagram of an example of an information management system according to an embodiment.

FIG. 1 is an explanatory diagram of an example of an information management system 100 according to an embodiment. The information management system 100 includes an apparatus 101 under management, a management function 102 that manages the apparatus 101, and an integration and management database (DB) 103. The information management system 100 may be one computer or may be configured by multiple computers.

The apparatus 101 will be described. The apparatus 101 is a set of various types of objects subject to management. For example, when applied to cloud computing, the apparatus 101 may include three types of objects subject to management including central processing units (CPU), virtual machines (VM), and business processes.

In FIG. 1, for example, objects under management are CPU#1 and CPU#2 as a CPU 111, VM#1 to VM#6 as a VM 112, and a process for business X 113X (X_Web, X_AP, and X_DB) and a process for business Y 113Y (Y_Web, Y_AP, and Y_DB) as a business process 113. "X_Web" and "Y_Web" are respectively programs that function as a web server. "X_AP" and "Y_AP" are respectively programs that function as an application server. "X_DB" and "Y_DB" are programs that function as a database server.

In the example depicted in FIG. 1, the CPU#1 controls the VM#1, VM#2, VM#4, and VM#5 and the CPU#2 controls the VM#3 and VM#6. The VM#1 controls the X_Web. The VM#2 controls the X_AP. The VM#3 controls the X_DB. The VM#4 controls the Y_Web. The VM#5 controls the Y_AP. The VM#6 controls the Y_DB.

In the apparatus 101, the CPU 111 controls the VM 112 and the VM 112 controls the business process 113. Therefore, when a fault occurs at an object that is a primary controlling entity, the fault further causes a fault to occur at the object under control. For example, if a fault occurs at the CPU#1, faults occur at the VM#1, the VM#2, the VM#4, and the VM#5, respectively. Similarly, if a fault occurs to the VM#1, the fault causes a fault to occur at the X_Web.

As described, concerning the occurrence of a fault, the objects that are under management and under the control of other objects under management are dependent on these primary-controlling-entity objects. Therefore, an object that is both under management and a primary controlling entity will be referred to as a "source-of-dependence object". Each of the objects that are under management and subject to control will be referred to as a "dependent object". As depicted in FIG. 1, the CPU 111 is a source-of-dependence object of the VM 112, and the VM 112 is a dependent object of the CPU 111. Similarly, the VM 112 is a source-of-dependence object of the business process 113, and the business process 113 is a dependent object of the VM 112. The relation between a source-of-dependence object and a dependent object in this manner will be referred to as "dependence relation".

As described, although the CPU 111 may be a source-of-dependence object, the CPU 111 cannot be a dependent object. Although the business process 113 may be a dependent object, the business process 113 cannot be a source-of-dependence object, whereas the VM 112 may be both a source-of-dependence object and a dependent object.

The management function 102 includes a management function 102 for each type of object under management. For example, the management function 102 includes a CPU management function 121 for the CPU 111, a VM management function 122 for the VM 112, and a business management function 123 for the business process 113.

The CPU management function 121 is software that manages the CPU 111 in the apparatus 101. The VM management function 122 is software that manages the VM 112 in the apparatus 101. The business management function 123 is software that manages the business process 113 in the apparatus 101. The management functions 121 to 123 respectively include DBs 124 to 126, collect events reported by each of the objects under management when a fault, a failure, or a change in the monitored communication state occurs, and store the events as logs.

The management function 102 includes an integration and management function 127. The integration and management function 127 collects the events stored in a decentralized manner according to the type of object under management and stores the events to an integration and management DB 103 as logs. In the embodiment, events to be stored to the integration and management DB 103 are screened to reduce overlapping storage of the events with the events stored in the DBs 124 to 126 of the management functions 121 to 123.

For example, from the perspective of a manager or the integration and management function 127, among various events, a fault event that has been reported by an object at which a fault has occurred, the origin of the fault, is important. Therefore, among fault events collected from the DBs 124 to 126, an event necessary in identifying the object under management where a fault has occurred is stored in the integration and management DB 103 as a log. The rest of the events are stored in the DBs 124 to 126 and therefore, even if the rest of the events are not stored in the integration and management DB 103, the events may be read when necessary by using the events stored in the integration and management DB 103 as hints.

FIG. 2 is an explanatory diagram of an example of the structure of data that is from an object under management and concerns an event that occurs. The structure includes, for example, a number column 201, a time stamp column 202, an event type column 203, an occurrence point column 204, an alarm type column 205, and a backup column 206. In the number column 201, a serial number that is attached to an event frame is entered. In the time stamp column 202 the time of occurrence of an event (for example, 2009_09_05_17:58:23) is entered.

The event type column 203 includes a flag to identify the type of event (for example, "0" indicates an alarm event and "1" indicates a quality monitoring event). In the occurrence point column 204, information that identifies the object where an event has occurred (for example, the CPU#1, the VM#2, or the Web#1) is entered. In the alarm type column 205, information that identifies the type of alarm (identification information such as that related to an apparatus, the VM 112, an application, communication, and quality) is entered. In the backup column 206, information is set as necessary.

Figure 3:
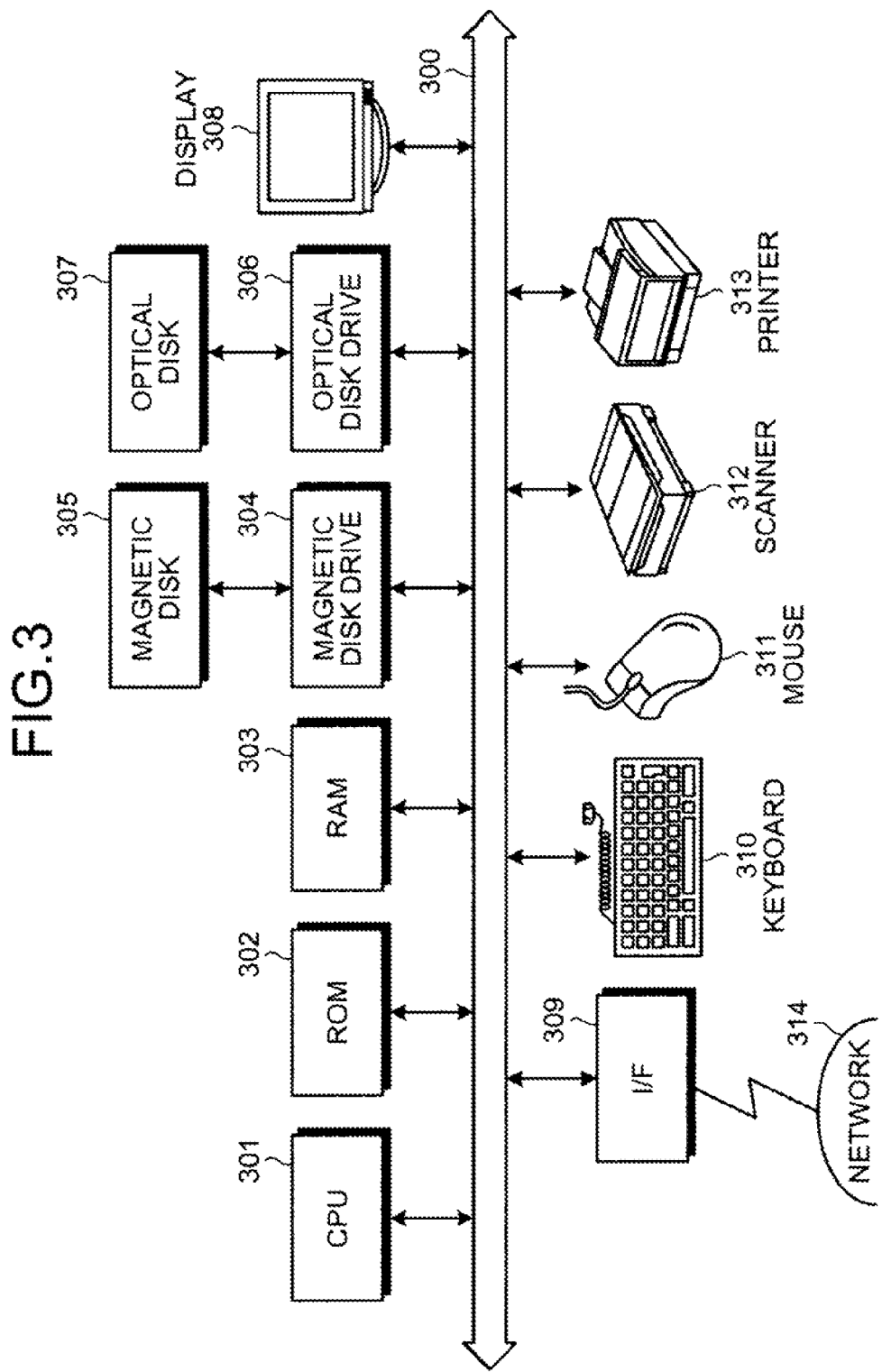
FIG. 3 is a block diagram of a hardware configuration of a computer used in the embodiment.

FIG. 3 is a block diagram of a hardware configuration of a computer used in the embodiment. As depicted in FIG. 3, the computer includes a central processing unit (CPU) 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, a mouse 311, a scanner 312, and a printer 313, respectively connected by a bus 300.

The CPU 301 governs overall control of the computer. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The display 308 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The scanner 312 optically reads an image and takes in the image data into the computer. The scanner 312 may have an optical character reader (OCR) function as well. The printer 313 prints image data and text data. The printer 313 may be, for example, a laser printer or an ink jet printer.

Figure 4:
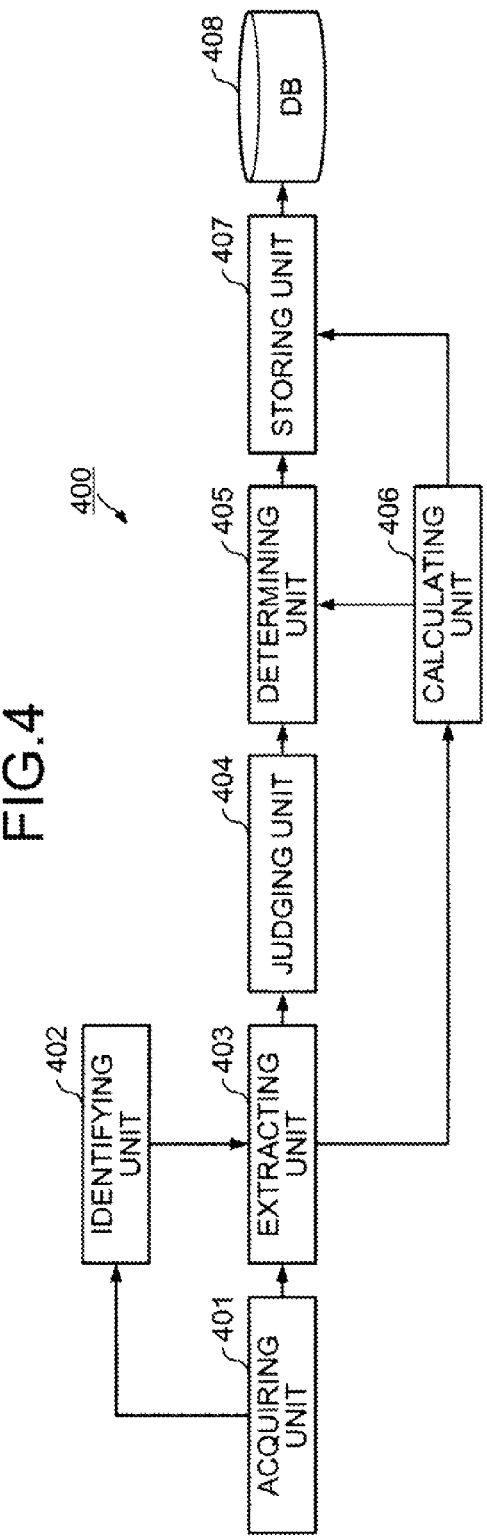
FIG. 4 is a block diagram of a functional configuration of an information managing apparatus.

FIG. 4 is a block diagram of a functional configuration of an information managing apparatus 400. The information managing apparatus 400 corresponds to the integration and management function 127. The information managing apparatus 400 includes an acquiring unit 401, an identifying unit 402, an extracting unit 403, a judging unit 404, a determining unit 405, a calculating unit 406, and a storing unit 407. More specifically, for example, functions of the acquiring unit 401 to the storing unit 407 are implemented by causing the CPU 301 to execute a program stored in a storage device such as the ROM 302, the RAM 303, the magnetic disk 305, or the optical disk 307 depicted in FIG. 3, or by using the I/F 309.

The acquiring unit 401 has a function of acquiring from databases that are for each type of object under management and store therein events for each type of object under management, a group of events that have occurred during a predetermined time period. More specifically, for example, the acquiring unit 401 reads the group of events that have occurred during the predetermined time period by referring to time stamps of the events stored in DBs 124 to 126.

The identifying unit 402 has a function of identifying a group of objects having dependent relations, based on information concerning an object that is the origin of occurrence and described in events among the group of events acquired by the acquiring unit 401. More specifically, for example, the occurrence point column 204 of each event acquired by the acquiring unit 401 describes therein information identifying the object that is the origin of occurrence. The identifying unit 402 identifies the group of objects under management and having dependent relations by using the identification information as a hint.

For example, when the occurrence point columns 204 of the events acquired describe therein "CPU#2", "VM#3", "VM#6", "X_DB", and "Y_DB", the "CPU#2", the "VM#3", the "VM#6", the "X_DB", and the "Y_DB" are identified as a group of objects under management and having dependent relations. In such identification by the identifying unit 402, a process allocation table can be used.

FIG. 5 is an explanatory diagram of an example of the contents of a process allocation table. A process allocation table 500 includes a number column 501 and an object under management column 502. The number column 501 includes numbers in ascending order of record. The object under management column 502 is divided according to type of object under management. In the example depicted in FIG. 5, the object under management column 502 is divided into a CPU column, a VM column, and a business process column. As described, the process allocation table 500 depicts how each of the CPU 111, the VM 112, and the business process 113 is allocated in the apparatus 101.

For example, the record for a number "1" includes the CPU#1, the VM#1, and the X_Web. The record for the number "1" indicates that the X_Web, which is the business process 113, is allocated to the VM#1 and the VM#1 is allocated to the CPU#1. It is assumed that the process allocation table 500 is set in advance by the manager.

The process allocation table 500 is implemented by a storage device such as the ROM 302, the RAM 303, the magnetic disk 305, and the optical disk 307 depicted in FIG. 3.

FIGS. 6 to 9 are explanatory diagrams of dependence relation information. The dependence relation information is information that expresses the extent of the effect that a fault occurring at an object under management has. A fault propagates from a source-of-dependence object to a dependent object and therefore, dependence relation information is set for each source-of-dependence object. In FIGS. 6 to 9, an ellipse denotes a node representing an object under management and a link between nodes represents a dependence relation. The node on the left side of a link is a source-of-dependence object and the node on the right side is a dependent object. Therefore, in the dependence relation information, the leftmost node indicates the object that is under management and the origin of a fault.

FIGS. 6 and 7 are explanatory diagrams of dependence relation information acquired when the CPU 111 is the origin of a fault. FIG. 6 depicts dependence relation information 600 acquired when the CPU#1 is the origin of a fault. FIG. 7 depicts dependence relation information 700 acquired when the CPU#2 is the origin of a fault.

Figure 8:
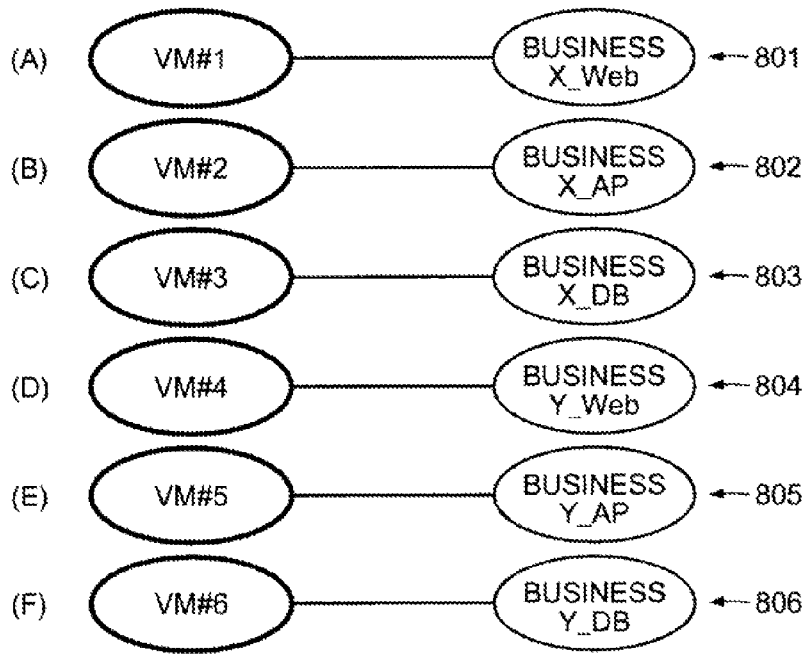
FIG. 8 is an explanatory diagram of dependence relation information acquired when a VM is the origin of a fault.

FIG. 8 is an explanatory diagram of dependence relation information acquired when the VM 112 is the origin of a fault. Section (A) of FIG. 8 depicts dependence relation information 801 acquired when the VM#1 is the origin of the fault. Section (B) depicts dependence relation information 802 acquired when the VM#2 is the origin of the fault. Section (C) depicts dependence relation information 803 acquired when the VM#3 is the origin of the fault.

Section (D) depicts dependence relation information 804 acquired when the VM#4 is the origin of the fault. Section (E) depicts dependence relation information 805 acquired when the VM#5 is the origin of the fault. Section (F) depicts dependence relation information 806 acquired when the VM#6 is the origin of the fault.

Figure 9:
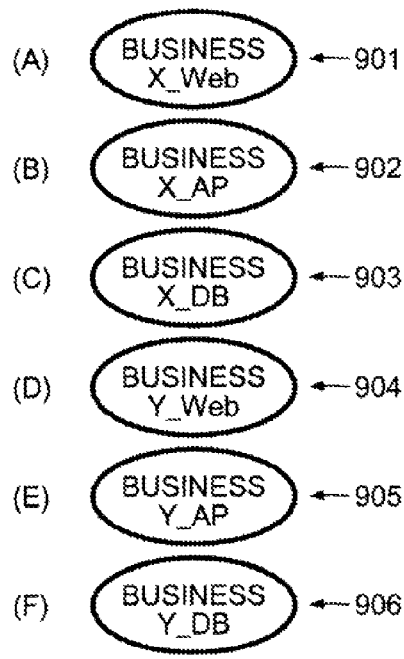
FIG. 9 is an explanatory diagram of dependence relation information acquired when a business process is the origin of a fault.

FIG. 9 is an explanatory diagram of dependence relation information acquired when the business process 113 is the origin of a fault. Section (A) of FIG. 9 depicts dependence relation information 901 acquired when the X_Web is the origin of the fault. Section (B) depicts dependence relation information 902 acquired when the X_AP is the origin of the fault. Section (C) depicts dependence relation information 903 acquired when the X_DB is the origin of the fault.

Section (D) depicts dependence relation information 904 acquired when the Y_Web is the origin of the fault. Section (E) depicts dependence relation information 905 acquired when the Y_AP is the origin of the fault. Section (F) depicts dependence relation information 906 acquired when the Y_DB is the origin of the fault.

A route from an object under management (origin) (the leftmost node) to an object under management at the other end (the rightmost node) is referred to as "path". For example, the dependence relation information 600 depicted in FIG. 6 has four paths, including {CPU#1 to VM#1 to X_Web}, {CPU#1 to VM#2 to X_AP}, {CPU#1 to VM#4 to Y_Web}, and {CPU#1 to VM#5 to Y_AP}.

Similar to the process allocation table 500, the dependence relation information may be set in advance by the manager. In the eXtensible Markup Language (XML) format, the dependence relation information can be expressed in a tree-like structure. As described, when the dependence relation information is set in advance, the identifying unit 402 uses, as a clue, the identification information that is for the origin of occurrence object under management and described in the occurrence point column 204 of each event acquired by the acquiring unit 401, and identifies the dependence relation information for a group of objects that are under management and have dependent relations.

For example, when the occurrence point column 204 of each event acquired describes identification information belonging to the CPU 111 (for example, the CPU#1), the identifying unit 402 identifies the dependence relation information 600 depicted in FIG. 6, from among the dependence relation information.

When the occurrence point column 204 of each event acquired describes identification information belonging to the VM 112 (for example, the VM#2) and has no identification information belonging to the CPU 111, the identifying unit 402 identifies the dependence relation information 802 depicted in section (B) of FIG. 8, from among the dependence relation information.

When the occurrence point column 204 of each event acquired describes identification information belonging to the business process 113 (for example, the X_DB) and has no identification information belonging to the CPU 111 or the VM 112, the identifying unit 402 identifies the dependence relation information 903 depicted in section (C) of FIG. 9, from among the dependence relation information.

Configuration may be such that no dependence relation information is set in advance, where relevant dependence relation information is identified by retrieving the relevant dependence relation information from the process allocation table 500 using the identifying unit 402. More specifically, for example, the process allocation table 500 is created in a relational DB and a retrieval expression in a Structured Query Language (SQL) prepared in advance is executed with respect to the process allocation table 500. Thereby, the result set (in a table format) acquired can be identified as the relevant dependence relation information.

Retrieval from the process allocation table 500 and identification as relevant dependence relation information eliminates the burden of creating the dependence relation information in advance. The relevant dependence relation information is written to memory only when the retrieval is executed and therefore, preparation of the dependence relation information is not necessary and a reduction in the amount of memory used can be facilitated.

The dependence relation information 600, 700, 801 to 806, and 901 to 906 is implemented by the storage device such as the ROM 302, the RAM 303, the magnetic disk 305, or the optical disk 307 depicted in FIG. 3.

In FIG. 4, the extracting unit 403 has a function of extracting from the group of events that have occurred at the group of objects under management and having dependence relations, a combination of a first event and a second event, the first event having occurred at a source-of-dependence object and the second event having occurred at a dependent object of the source-of-dependence object.

Specifically, for example, the extracting unit 403 extracts the nodes at both ends of each link in the relevant dependence relation information. For example, for the dependence relation information 600 depicted in FIG. 6, eight combinations are extracted, including {CPU#1, VM#1}, {VM#1, X_Web}, {CPU#1, VM#2}, {VM#2, X_AP}, {CPU#1, VM#4}, {VM#4, Y_Web}, {CPU#1, VM#5}, and {VM#5, Y_AP}.

The judging unit 404 has a function of judging the existence or the non-existence of a dependence relation between the first and the second events, using the difference between the time of the occurrence of the first event and that of the second event, for each combination of nodes extracted by the extracting unit 403.

For example, the judging unit 404 reads from the time stamp of the event, the time of occurrence of an event that has occurred at one object under management of a combination extracted by the extracting unit 403. Similarly, the judging unit 404 reads from the time stamp of the event, the time of occurrence of an event that has occurred at the other object under management. The judging unit 404 then calculates the difference between the time stamps.

The difference is presented as the absolute value of the difference in time between the time stamps. The event that has occurred at the source-of-dependence object is typically detected sooner than the event that has occurred at the dependent object. However, for some reason, the event that has occurred at the dependent object may be detected sooner. Therefore, the absolute value of the difference in time between the time stamps is used as the difference. If the difference is within a threshold value Ts, the judging unit 404 judges that a fault-dependent relation exists between the events. On the other hand, if the difference is not within the threshold value Ts, the judging unit 404 judges that no fault-dependent relation exists between the events.

Figure 10:
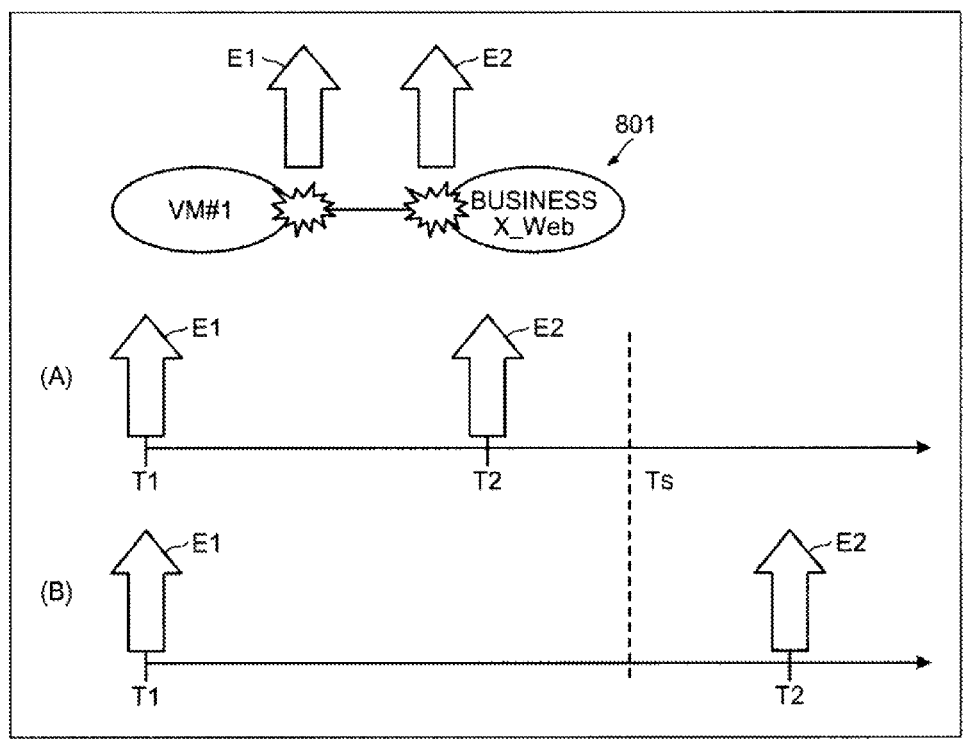
FIG. 10 is an explanatory diagram of a first example of a judging process by a judging unit.

FIG. 10 is an explanatory diagram of a first example of a judging process by the judging unit 404. In FIG. 10, the combination {VM#1, X_Web} acquired from the dependence relation information 801 depicted in section (A) of FIG. 8 is taken as an example and it is assumed that an event E1 occurs at the VM#1 at a time T1 and an event E2 occurs at the X_Web at a time T2.

In section (A) of FIG. 10, the difference |T2−T1| is |T2−T1|≤Ts and therefore, it is judged that a fault-dependent relation exists between the events E1 and E2. In section (B), the difference |T2−T1| is |T2−T1|>Ts and therefore, it is judged that no fault-dependent relation exists between the events E1 and E2.

Figure 11:
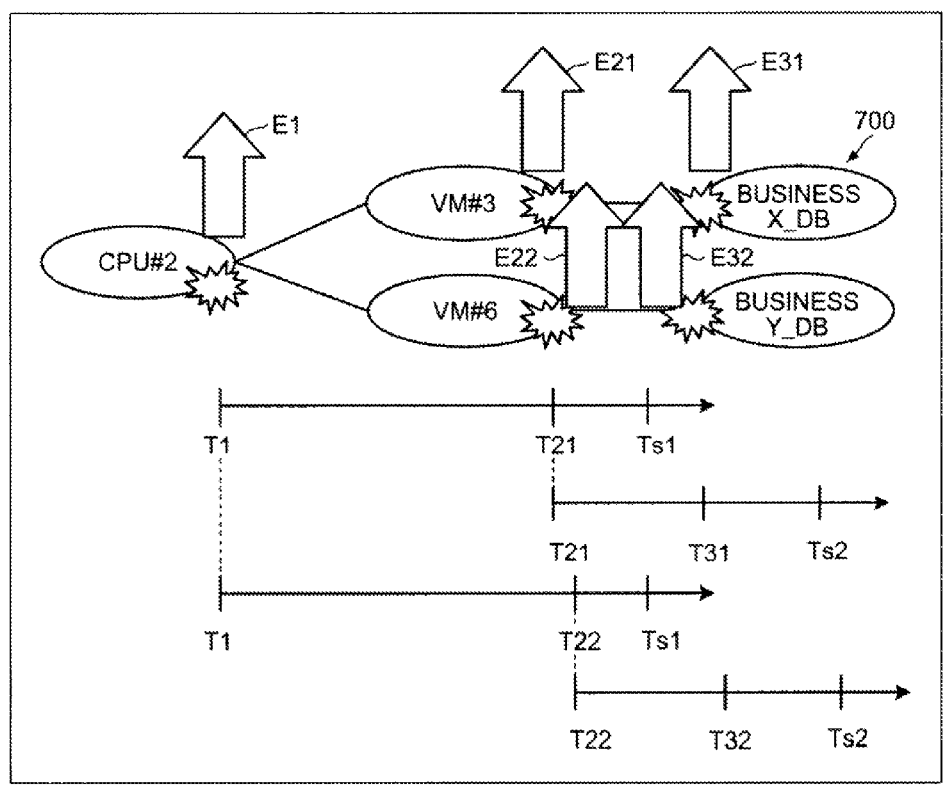
FIG. 11 is an explanatory diagram of a second example of the judging process by the judging unit 404.

FIG. 11 is an explanatory diagram of a second example of the judging process by the judging unit 404. In FIG. 11, the four combinations including {CPU#2, VM#3}, {VM#3, X_DB}, {CPU#2, VM#6}, and {VM#6, Y_DB} that are acquired from the dependence relation information 700 depicted in FIG. 7 are taken as examples and it is assumed that the event E1 occurs at the CPU#2 at the time T1, an event E21 occurs at the VM#3 at a time T21, an event E31 occurs at the X_DB at a time T31, an event E22 occurs at the VM#6 at a time T22, and an event E32 occurs at the Y_DB at a time T32.

The threshold value Is between the CPU 111 and the VM 112 is Ts1 and the threshold value Is between the VM 112 and the business process 113 is Ts2. The threshold values Ts1 and Ts2 may freely be set by the manager, and may be Ts1=Ts2 and may also be Ts1≠Ts2.

In this example, the four combinations including {CPU#2, VM#3}, {VM#3, X_DB}, {CPU#2, VM#6}, and {VM#6, Y_DB} are extracted and therefore, the differences thereof, |T21−T1|, |T31−T21|, |T22−T1, and |T32−T22|, are calculated and it is judged whether each of the differences is within the corresponding threshold value Ts1 or Ts2. In the example of FIG. 11, all the differences, |T21−T1|, |T31−T21|, |T22−T1|, and |T32−T22|, are within the corresponding threshold value Ts1 or Ts2. Therefore, it is judged that dependence relations exist among the events E1, E21, E31, E22, and E32.

Figure 12:
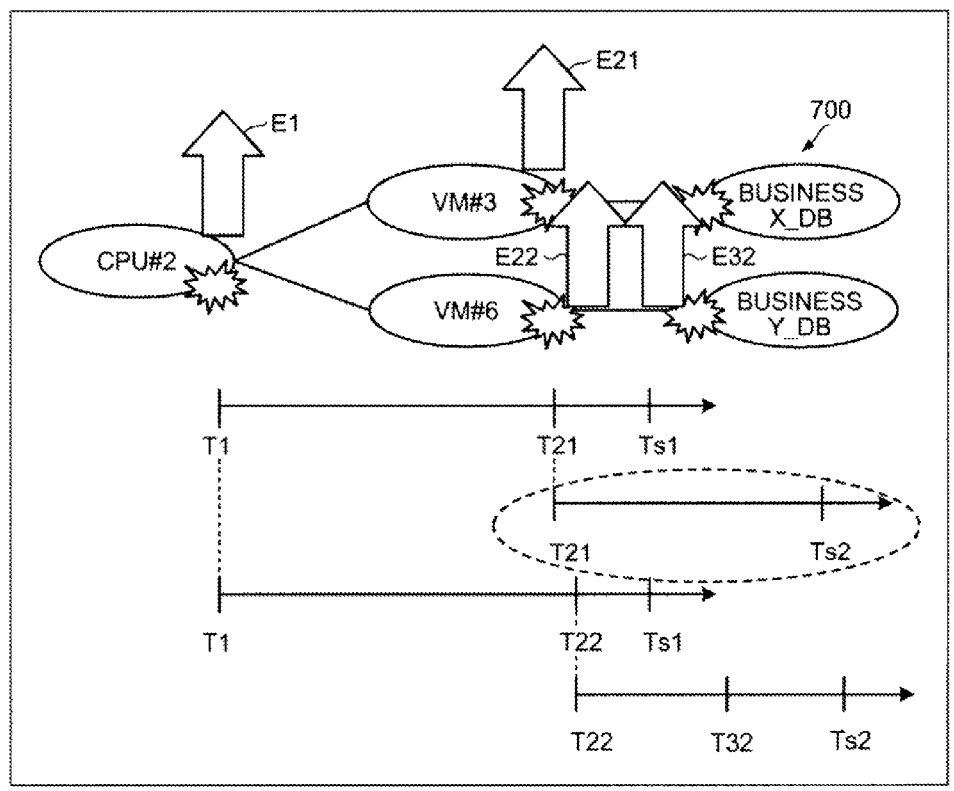
FIG. 12 is an explanatory diagram of a third example of the judging process by the judging unit.

FIG. 12 is an explanatory diagram of a third example of the judging process by the judging unit 404. FIG. 12 depicts an exemplary judging process executed when the event E31 is not reported in the example depicted in FIG. 11. It is assumed that the event E31 has actually occurred, but is not reported for some reason, or has not actually occurred and therefore, is not reported.

In such a case, the judging process is executed for the combinations {CPU#2, VM#3}, {CPU#2, VM#6}, and {VM#6, Y_DB} among the four combinations including {CPU#2, VM#3}, {VM#3, X_DB}, {CPU#2, VM#6}, and {VM#6, Y_DB}. In the example depicted in FIG. 12, the differences |T21−T1|, |T22−T1|, and |T32−T22| are within the corresponding threshold value Ts1 or Ts2. Therefore, it is judged that dependence relations exist among the events E1, E21, E22, and E32.

Because the event E31 is omitted, it may be judged that no dependence relation exists among the events E1, E21, E22, and E32. Because the omission of the event E31 is known prior to the calculation of the differences, it may be judged that no dependence relation exists among the events E1, E21, E22, and E32, without executing the calculation of the differences. Thereby, a reduction in the calculation load can be facilitated.

Figure 13:
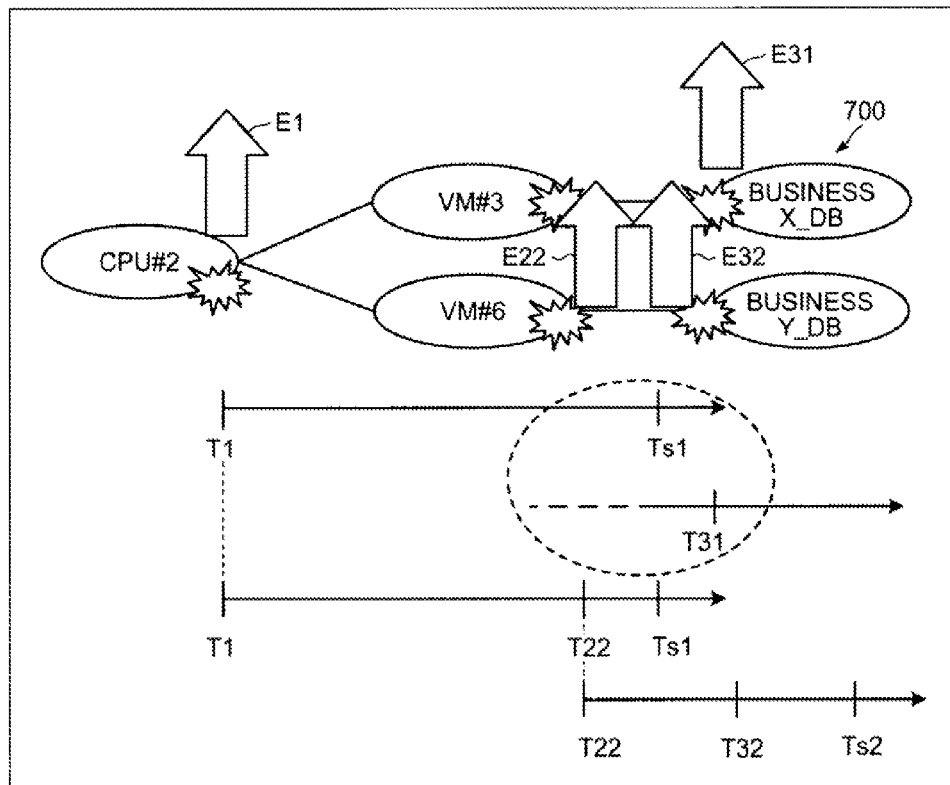
FIG. 13 is an explanatory diagram of a fourth example of the judging process by the judging unit.

FIG. 13 is an explanatory diagram of a fourth example of the judging process by the judging unit 404. FIG. 13 depicts an exemplary judging process executed when the event E21 is not reported for some reason in the specific example depicted in FIG. 11. It is assumed that the event E21 has actually occurred and is not reported for some reason, or has not actually occurred and therefore, is not reported.

In such a case, a judging process is executed for the combinations {CPU#2, VM#6}, and {VM#6, Y_DB} among the four combinations including {CPU#2, VM#3}, {VM#3, X_DB}, {CPU#2, VM#6}, and {VM#6, Y_DB}. In the example depicted in FIG. 13, the differences |T22−T1| and |T32−T22| are within the corresponding threshold value Ts1 or Ts2. Therefore, it is judged that dependence relations exist among the events E1, E31, E22, and E32.

Because the event E21 is omitted, it may be judged that no dependence relation exists among the events E1, E31, E22, and E32 and since the omission of the event E21 is known prior to the calculation of the differences, it may be judged that no dependence relation exists among the events E1, E31, E22, and E32, without executing the calculation of the differences. Thereby, a reduction in the calculation load can be facilitated.

Figures 14, 15:
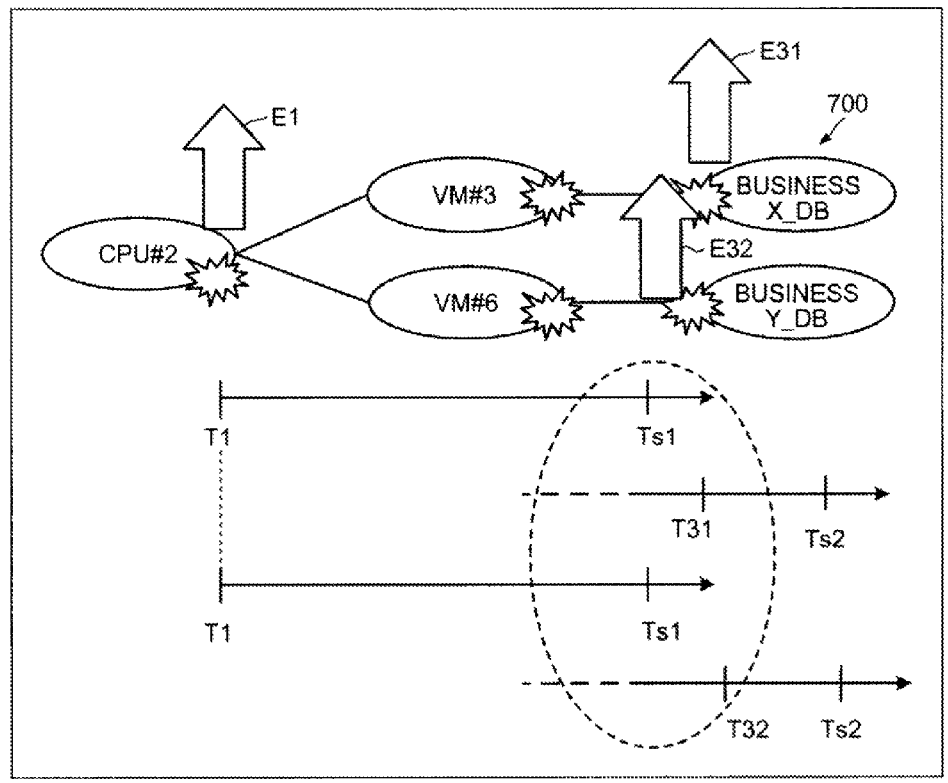
FIG. 14 is an explanatory diagram of a fifth example of the judging process by the judging unit.
FIG. 15 is an explanatory diagram of an example of the storage contents of an integration and management DB.

FIG. 14 is an explanatory diagram of a fifth example of the judging process by the judging unit 404. FIG. 14 depicts an exemplary judging process executed when the events E21 and E22 are not reported in the example depicted in FIG. 11. It is assumed that the events E21 and E22 have actually occurred and are not reported for some reason, or have not actually occurred and therefore, are not reported.

In such a case, the difference can not be calculated for any of the four combinations including {CPU#2, VM#3}, {VM#3, X_DB}, {CPU#2, VM#6}, and {VM#6, Y_DB}. Therefore, it is judged that no dependence relation exists among the events E1, E31, and E32.

Referring back to FIG. 4, the determining unit 405 has a function of determining, as an event to be stored and from among the group of events, an event that has occurred at an object that is a source-of-dependence object but not a dependent object, based on the judgment result judged by the judging unit 404.

More specifically, when the judging unit 404 judges that dependence relations exist among all the combinations, the determining unit 405 determines an event that has occurred at an object that is a source-of-dependence object but not a dependent object, to be an event to be stored. For example, an object that is under management and represented as the leftmost node in dependence relation information is an object that is a source-of-dependence object but not a dependent object and therefore, the object that is the leftmost node in the dependence relation information is the origin of a fault. Hence, an event that has occurred at the object that is the leftmost node in the dependence relation information is determined to be an event to be stored.

For example, in the example depicted in section (A) of FIG. 10, the event E1 that has occurred at the VM#1 is determined to be an event to be stored. Therefore, the determining unit 405 determines the event E1 to be an event to be stored whereas conventionally, the two events E1 and E2 would be determined to be events to be stored. Hence, a 50% reduction can be achieved.

In the example depicted in FIG. 11, the event E1 that has occurred at the CPU#2 is determined to be an event to be stored. Therefore, the determining unit 405 determines the event E1 to be an event to be stored whereas conventionally, the five events E1, E21, E31, E22, and E32 would be determined to be events to be stored. Hence, an 80% reduction can be achieved.

In the examples depicted in FIGS. 12 and 13, if it is judged that dependence relations exist, the event E1 that has occurred at the CPU#2 is determined to be an event to be stored. Therefore, the determining unit 405 determines the event E1 to be an event to be stored whereas conventionally, the four events E1, E21/E31, E22, and E32 would be determined to be events to be stored. Hence, a 75% reduction can be achieved.

If the judging unit 404 judges that no dependence relation exists, the determining unit 405 determines the group of events among which dependence relations have been judged to not exist to be events to be stored. For example, in section (B) of FIG. 10, it is judged that no dependence relation exists between the events E1 and E2 and therefore, the events E1 and E2 are determined to be events to be stored.

The calculating unit 406 has a function of calculating the degree of reliability concerning the events to be stored, based on the total number of combinations and the number of combinations for which the first and the second events have been extracted. The degree of reliability is an index value that evaluates the reliability of a judgment, by the judging unit 404, that a dependence relation exists. For example, the degree of reliability is a value acquired by using, as the denominator, the total number of combinations and, as the numerator, the number of combinations having the extracted first and second events.

For example, in the example depicted in section (A) of FIG. 10, one combination is present, {VM#1, X_Web}, and therefore, the total number of combinations is one. The event E1 that has occurred at the VM#1 and the event E2 that has occurred at the X_Web are extracted and therefore, the number of combinations related to the extracted first and second events is one. Therefore, the degree of reliability is 1/1. Similarly, in the example depicted in FIG. 11, the degree of reliability is 4/4.

In the example depicted in FIG. 12, four combinations are present, {CPU#2, VM#3}, {VM#3, X_DB}, {CPU#2, VM#6}, and {VM#6, Y_DB} and therefore, the total number of combinations is four. The first and the second events have been extracted for each of the three combinations including {CPU#2, VM#3}, {CPU#2, VM#6}, and {VM#6, Y_DB} and therefore, the number of combinations related to the extracted first and second events is three. Hence, the degree of reliability is 3/4. Similarly, the degree of reliability is 2/4 in the example depicted in FIG. 13 and the degree of reliability is 0/4 in the example depicted in FIG. 14.

The determining unit 405 may determine the events to be stored, based on the degree of reliability calculated by the calculating unit 406. For example, a predetermined degree of reliability P that is a threshold value is set in advance. The manager can freely set the predetermined degree of reliability P.

The determining unit 405, from among a group of events that have been judged by the judging unit 404 to have dependence relations, determines an event that has occurred at an object that is a source-of-dependence object but not a dependent object (an event that is the origin of the fault), to be an event to be stored, if the degree of reliability calculated by the calculating unit 406 is equal to or higher than the predetermined degree of reliability P. On the other hand, if the degree of reliability calculated by the calculating unit 406 is lower than the predetermined degree of reliability P, the determining unit 405 determines the group of events that have been judged by the judging unit 404 to have dependence relations to be events to be stored.

For example, if the predetermined degree of reliability P is set to be P=70%, the degree of reliability of 1/1 in the example depicted in section (A) of FIG. 10 is equal to or higher than the predetermined degree of reliability P and therefore, the event E1 is determined to be an event to be stored. The degree of reliability of 4/4 in the example depicted in FIG. 11 is equal to or higher than the predetermined degree of reliability P and therefore, the event E1 is determined to be an event to be stored.

The degree of reliability of 3/4 in the example depicted in FIG. 12 is equal to or higher than the predetermined degree of reliability P and therefore, the event E1 is determined to be an event to be stored. The degree of reliability of 2/4 in the example depicted in FIG. 13 is lower than the predetermined degree of reliability P and therefore, the events E1, E31, E22, and E32 are determined to be events to be stored. The degree of reliability of 0/4 in the example depicted in FIG. 14 is lower than the predetermined degree of reliability P and therefore, the events E1, E31, and E32 are determined to be events to be stored.

Referring back to FIG. 4, the storing unit 407 has a function of storing to the DB 408, the information concerning events to be stored as determined by the determining unit 405. More specifically, for example, the storing unit 407 stores to the integration and management DB 103, as records, information for each of the events to be stored such as the event number, the time stamp, the type of event, the occurrence point, the type of alarm, and a backup.

FIG. 15 is an explanatory diagram of an example of the storage contents of the integration and management DB 103. The storing unit 407 may store all of the information described in the events to be stored. However, it is sufficient for the storing unit 407 to store at least the event number and the occurrence point. If the event number and the occurrence point are stored, the retrieval from the DBs 124 to 126 can be executed.

The storing unit 407 may also store the degree of reliability calculated by the calculating unit 406. In this case, the degree of reliability can be stored in the backup column 206 of the integration and management DB 103. Thereby, for example, in a case such as that depicted in FIG. 12, even if the dependence relation between the VM#3 and the X_DB is unknown because the event E31 is not reported, the degree of reliability 3/4 is stored and correlated with the event E1. Therefore, by referring to these items when checking the storage contents of the integration and management DB 103, the manager can use these items as criteria for determining whether only the CPU#2 that is the occurrence source of the event E1 should be checked or other objects under management (the VM#3, the VM#6, and the Y_DB) should also be checked.

Figure 16:
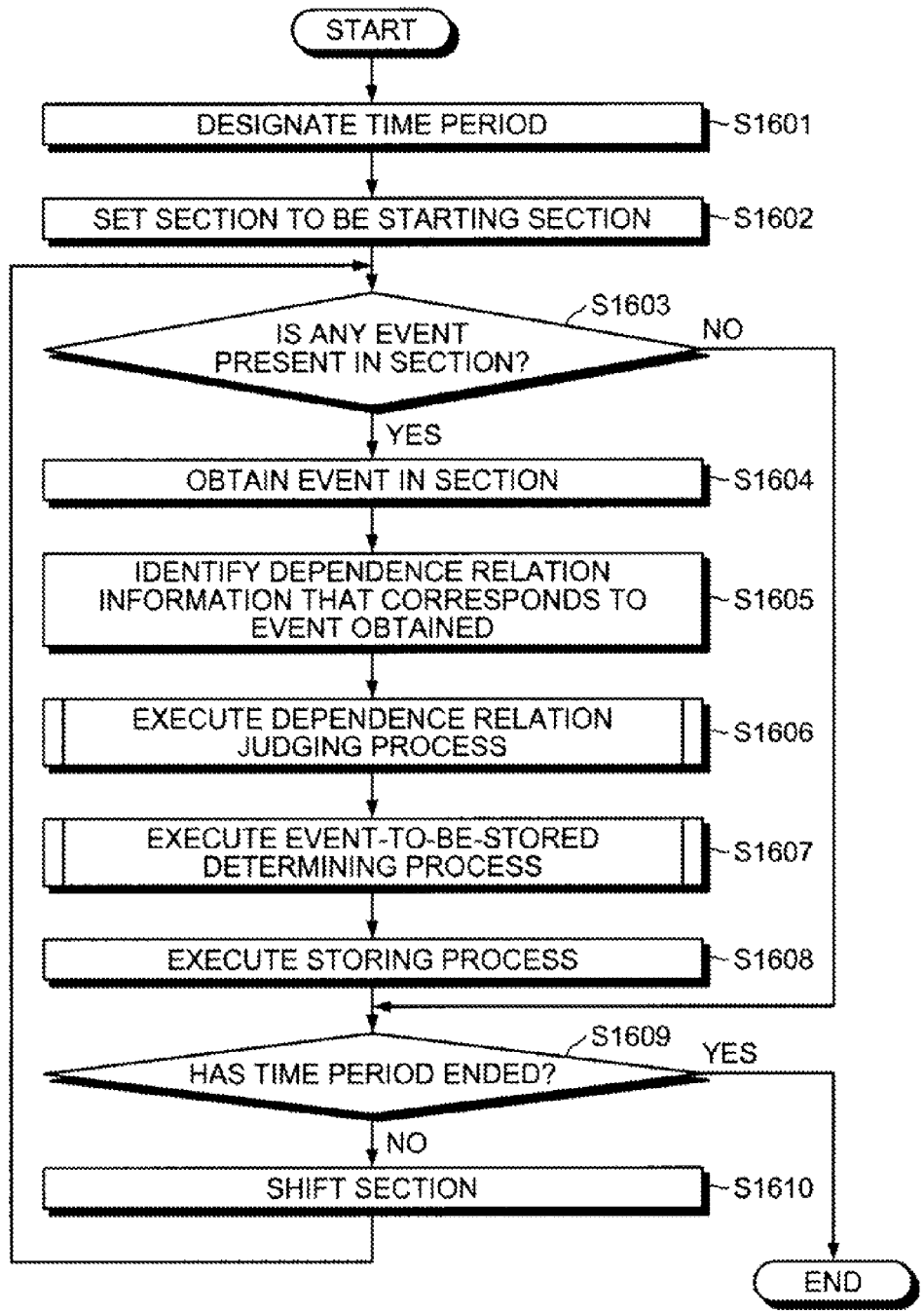
FIG. 16 is a flowchart of an information managing process procedure by the information managing apparatus according to the embodiment.

FIG. 16 is a flowchart of an information managing process procedure by the information managing apparatus 400 according to the embodiment. The information managing apparatus 400 first designates a time period as an initial setting (step S1601) and sets a section to be a starting section in the time period (step S1602). The information managing apparatus 400 determines whether any event is present in the section, by referring to the DBs 124 to 126 (step S1603).

If it is determined that an event is present in the section (step S1603: YES), the information managing apparatus 400, using the acquiring unit 401, acquires the event in the section from the DBs 124 to 126 (step S1604) and using the identifying unit 402, identifies dependence relation information that corresponds to the acquired event (step S1605).

The information managing apparatus 400, using the judging unit 404, executes a dependence relation judging process (step S1606) and using the determining unit 405, executes an event-to-be-stored determining process (step S1607). The information managing apparatus 400 stores to the DB 408 (the integration and management DB 103), the event that is to be stored as determined by the event-to-be-stored determining process (step S1607) (step S1608).

Thereafter, it is determined whether the time period has come to an end (step S1609). If it is determined that the time period has not yet come to an end (step S1609: NO), the section is shifted (step S1610), the next section is subject to processing and the procedure returns to step S1603. An event may be reported between the current section and the next section and therefore, the next section may be set to have portion overlapping the current section.

If it is determined at step S1603 that no event is present in the section (step S1603: NO), the procedure proceeds to step S1609. If it is determined at step S1609 that the time period has come to an end (step S1609: YES), the series of information managing process steps comes to an end.

Figure 17:
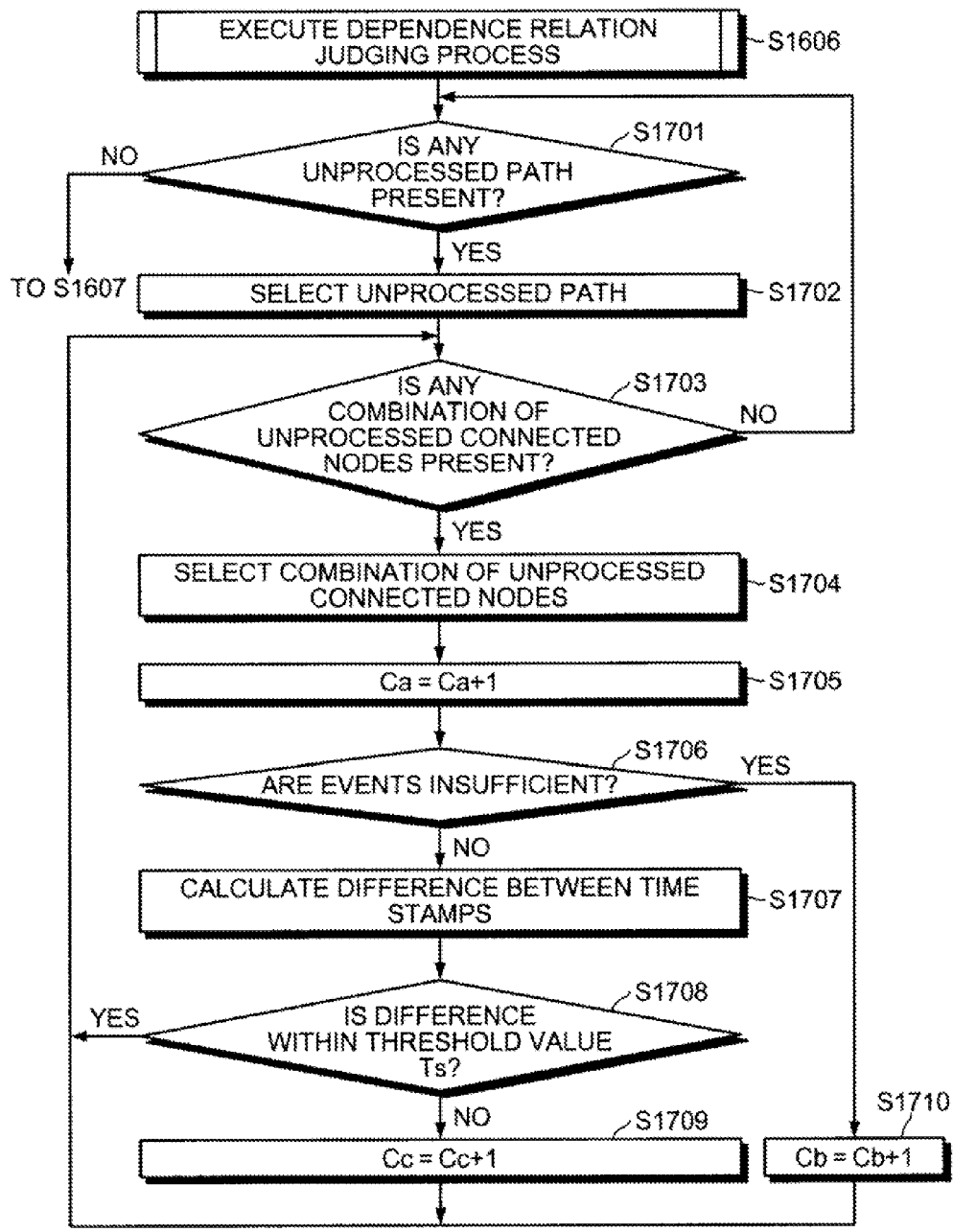
FIG. 17 is a flowchart of a detailed process procedure of a dependence relation judging process (step S1606) depicted in FIG. 16.

FIG. 17 is a flowchart of a detailed process procedure of the dependence relation judging process (step S1606) depicted in FIG. 16. The information managing apparatus 400 first determines whether a path for which dependence relation judgment has not been executed is present in the dependence relation information identified at step S1605 (step S1701). If it is determined that no path for which dependence relation judgment has not been executed is present (step S1701: NO), the procedure proceeds to step S1607.

If it is determined that a path for which dependence relation judgment has not been executed is present (step S1701: YES), the information managing apparatus 400 selects the path for which dependence relation judgment has not been executed (step S1702). For example, in the case of the dependence relation information 700 depicted in FIG. 7, a path for which dependence relation judgment has not been executed is selected from among the two paths of {CPU#2 to VM#3 to X_DB} and {CPU#2 to VM#6 to Y_DB}.

The information managing apparatus 400 determines whether a combination of unprocessed connected nodes is present in the path selected (step S1703). A combination of connected nodes is a combination of a first event that has occurred at a source-of-dependence object and a second event that has occurred at a dependent object of the source-of-dependence object, the first and the second events being among the group of events that have occurred at the objects that have dependence relations. In other words, a combination of connected nodes is a combination of nodes connected by links. If it is determined that no combination of unprocessed connected nodes is present (step S1703: NO), the procedure proceeds to step S1701.

If it is determined that a combination of unprocessed connected nodes is present (step S1703: YES), the information managing apparatus 400 selects the combination of unprocessed connected nodes (step S1704). For example, in the case of the dependence relation information 600 depicted in FIG. 6, a combination of unprocessed connected nodes is selected from among the eight combinations including {CPU#1, VM#1}, {VM#1, X_Web}, {CPU#1, VM#2}, {VM#2, X_AP}, {CPU#1, VM#4}, {VM#4, Y_Web}, {CPU#1, VM#5}, and {VM#5, Y_AP}.

The information managing apparatus 400 increments a counter Ca (whose initial value is Ca=0) that counts the total number of the combinations selected (step S1705). The information managing apparatus 400 determines whether events in the combination of the connected nodes selected are insufficient (step S1706). If it is determined that the events are not insufficient (step S1706: NO), the information managing apparatus 400 reads the time stamp of the event from each object under management in the combination of the connected nodes selected, and calculates the time difference (step S1707).

The information managing apparatus 400 determines whether the time difference is within the threshold value Ts (step S1708). If it is determined that the time difference is within the threshold value Ts (step S1708: YES), a dependence relation is established and the procedure returns step S1703. On the other hand, if it is determined that the difference is not within the threshold value Ts (step S1708: NO), no dependence relation is established and the information managing apparatus 400 increments a counter Cc (whose initial value is Cc=0) that counts the number of non-established dependence relations (step S1709) and the procedure returns to step S1703.

If it is determined at step S1706 that the events are insufficient (step S1706: YES), the information managing apparatus 400 increments a counter Cb (whose initial value is Cb=0) that counts the number of unreported events present (step S1710) and the procedure returns to step S1703.

A detailed process procedure of the event-to-be-stored determining process (step S1607) depicted in FIG. 16 will be described with reference to FIGS. 18 to 20.

Figure 18:
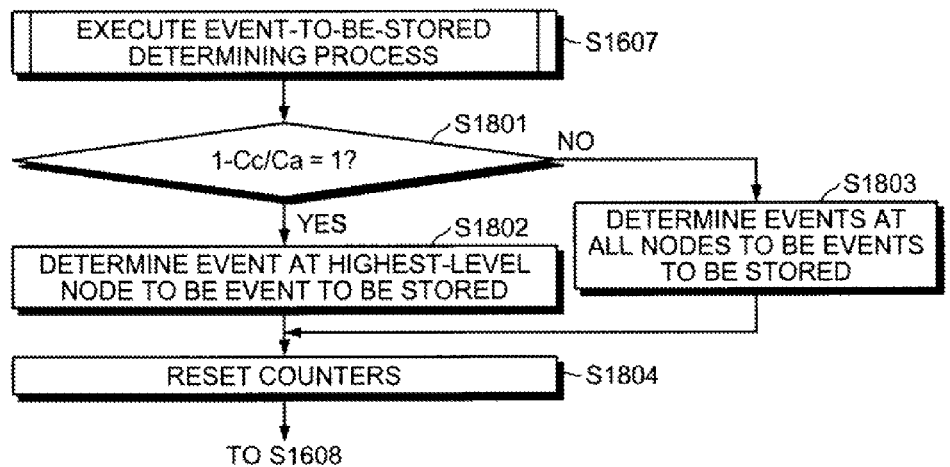
FIG. 18 is a first flowchart of an event-to-be-stored determining process (step S1607) depicted in FIG. 16.

FIG. 18 is a first flowchart of the event-to-be-stored determining process (step S1607) depicted in FIG. 16. The flowchart depicted in FIG. 18 is the process procedure for determining an event that has occurred at an object that is a source-of-dependence object but not a dependent object (a highest-level node), to be an event that is to be stored, if a dependence relation has been established among all of the combinations of the connected nodes selected in the current section.

As depicted in FIG. 18, the information managing apparatus 400 first determines whether $(1-Cc/Ca)$ is 1 (step S1801). If it is determined that $1-Cc/Ca=1$ (step S1801: YES), the information managing apparatus 400 determines the event at the highest-level node to be an event that is to be stored (step S1802). On the other hand, if it is determined that $1-Cc/Ca \neq 1$ (step S1801: NO), the information managing apparatus 400 determines the group of events reported by all of the nodes in the dependence relation information identified, to be events that are to be stored (step S1803).

After step S1802 or S1803, the information managing apparatus 400 resets the counters Ca and Cc (step S1804) and the procedure proceeds to step S1608. Thereby, an event that has occurred at an object that is a source-of-dependence object but not a dependent object (the highest-order node) can be determined to be an event that is to be stored, if a dependence relation is established among all of the combinations of the connected nodes selected in the current section and therefore, a reduction in the amount of events to be stored can be facilitated.

Figure 19:
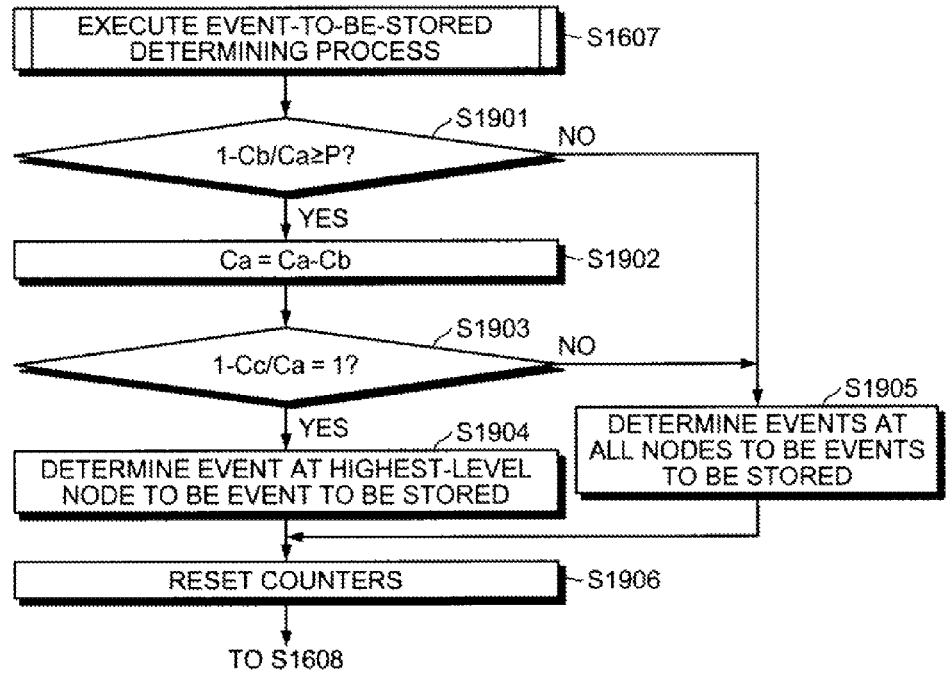
FIG. 19 is a second flowchart of the event-to-be-stored determining process (step S1607) depicted in FIG. 16.

FIG. 19 is a second flowchart of the event-to-be-stored determining process (step S1607) depicted in FIG. 16. The flowchart depicted in FIG. 19 is a process procedure for determining an event to be stored according to the degree of reliability $(1-Cb/Ca)$.

The information managing apparatus 400 first determines whether the degree of reliability $(1-Cb/Ca)$ is $1-Cb/Ca \geq P$ (step S1901). If it is determined that the degree of reliability $(1-Cb/Ca)$ is $1-Cb/Ca \geq P$ (step S1901: YES), the information managing apparatus 400 calculates Ca that is Ca=Ca−Cb to exclude the number corresponding to Cb from Ca that represents the total number of combinations (step S1902). The information managing apparatus 400 determines whether $1-Cc/Ca$ is 1 (step S1903). If it is determined that $1-Cc/Ca=1$ (step S1903: YES), the information managing apparatus 400 determines the event at the highest-order node to be an event that is to be stored (step S1904).

If it is determined that $1-Cc/Ca \neq 1$ (step S1903: NO), the information managing apparatus 400 determines the group of events reported from all of the nodes in the dependence relation information identified, to be events that are to be stored (step S1905). If it is determined at step S1901 that the degree of reliability $(1-Cb/Ca)$ is not $1-Cb/Ca \geq P$ (step S1901: NO), the procedure proceeds to step S1905. After step S1904 or S1905, the information managing apparatus 400 resets the counters Ca to Cc (step S1906) and the procedure proceeds to step S1608.

Thereby, the events to be stored can be determined corresponding to the degree of reliability. Therefore, even in an exceptional case such as that where no event notice is issued, a reduction in the amount of events to be stored can be facilitated. The amount of events to be stored can be adjusted according to the setting of the predetermined degree of reliability P and therefore, the information managing apparatus 400 enables flexible information management based on the number of managers and their capacity.

FIG. 20 is a third flowchart of the event-to-be-stored determining process (step S1607) depicted in FIG. 16. The flowchart depicted in FIG. 20 is a process procedure executed when the degree of reliability $(1-Cb/Ca)$ are stored together with the events to be stored.

The information managing apparatus 400 calculates the degree of reliability $(1-Cb/Ca)$ (step S2001) and calculates Ca as Ca=Ca−Cb to exclude the number corresponding to Cb from Ca that represents the total number of combinations (step S2002). The information managing apparatus 400 determines whether $(1-Cc/Ca)$ is 1 (step S2003). If it is determined that $1-Cc/Ca=1$ (step S2003: YES), the information managing apparatus 400 determines the event at the highest-level node to be an event that is to be stored (step S2004).

If it is determined that $(1-Cc/Ca)$ $1-Cc/Ca \neq 1$ (step S2003: NO), the information managing apparatus 400 determines the group of events that are reported from all the nodes in the dependence relation information identified, to be the events to be stored (step S2005). After step S2004 or S2005, the information managing apparatus 400 resets the counters Ca to Cc (step S2006) and the procedure proceeds to step S1608.

Thereby, the degree of reliability is also stored together with the events to be stored. Therefore, when the manager refers to the DB 408 (the integration and management DB 103), the manager can use the degree of reliability as an index for determining whether the DBs 124 to 126 are to be searched, based on the degree of reliability.

As described, according to the embodiment, an event that is the origin of an fault is determined as an event that is to be stored, therefore storage of an unnecessary event that is not the origin of the fault can be suppressed even if the event is an important event.

In other words, if only events that are the origin of a fault are stored, by referring to the dependence relation information using the information held by the event as a key, only events from objects under management and propagated by the dependence relation need be retrieved from the DBs 124 to 126. Therefore, a reduction in the amount of data stored and higher efficiency in event retrieval can be facilitated. If an event that is the origin of the fault is known, the object under management where the event has occurred can be identified and therefore, easier maintenance can be facilitated.

An event that is the origin can be stored according to the degree of reliability and therefore, even in an exceptional case such as that where no event notice is issued, a reduction in the amount of events to be stored can be facilitated. The amount of events to be stored can be adjusted according to the setting of the predetermined degree of reliability P, thereby enabling flexible information management corresponding to the number of managers and their capacity.

The degree of reliability is also stored together with the events to be stored. Therefore, when the manager refers to the database (the integration and management DB 103), the manager can use the degree of reliability as an index for determining whether the DBs 124 to 126 are to be searched, based on the degree of reliability.

In the embodiment, any object that reports a fault event and a monitoring event can be an object under management. For example, in cloud computing, such an object may be a network configuration, a server, a client, or an object under management that indicates an intermediate logic layer in the server and the client.

In this case, for example, in a system that is in a cloud computing environment and monitors a server, a client, and a network connecting these objects, the embodiment is effective for a system that is equipped with storage of a large capacity to accommodate storage of a huge amount of events as logs.

As described, the embodiment effects efficient reduction in the amount of information to be stored.

The information managing method described in the present embodiment may be implemented by executing a prepared program on a computer such as a personal computer and a workstation. The program is stored on a computer-readable non-transitory recording medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein an information managing program causing a computer to execute a process comprising:
   extracting from a group of events that have occurred at a group of objects under management and having dependence relations, combinations of a first event that has occurred at a source-of-dependence object and a second event that has occurred at a dependent object that is dependent on the source-of-dependence object;
   judging for each extracted combination, whether a dependence relation exists between the first event and the second event, by using the difference between the time of occurrence of the first event and that of the second event;
   calculating a degree of reliability by dividing the number of combinations having the extracted first and second events by the total number of the combinations; and
   determining from among the group of events and based on a judgment result obtained at the judging and the degree of reliability calculated at the calculating, an event that has occurred at an object that is a source-of-dependence object but not a dependent object, to be an event that is to be stored.

2. The computer-readable, non-transitory medium according to claim 1, wherein
   the determining includes determining the event that has occurred at the object that is a source-of-dependence object but not a dependent object, to be the event that is to be stored if at the judging, a dependence relation is judged to exist for all of the combinations.

3. The computer-readable, non-transitory medium according to claim 1, the process further comprising storing to a database, information related to the event to be stored.

4. The computer-readable, non-transitory medium according to claim 1, the process further comprising:
   acquiring from a group of databases respectively for each type of object under management and storing therein events for each type of object under management, a group of events that have occurred during a predetermined time period; and
   identifying a group of objects under management and having dependence relations, based on information concerning an object that is under management, is an origin of occurrence, and is described in each event among the acquired group of events, wherein
   the extracting includes extracting a combination of the first and second events from a group of events that have occurred at the identified group of objects under management and having dependence relations.

5. An information managing method of a computer, the information managing method comprising:
   extracting from a group of events that have occurred at a group of objects under management and having dependence relations, combinations of a first event that has occurred at a source-of-dependence object and a second event that has occurred at a dependent object that is dependent on the source-of-dependence object;
   judging for each extracted combination, whether a dependence relation exists between the first event and the second event, by using the difference between the time of occurrence of the first event and that of the second event;

calculating a degree of reliability by dividing the number of combinations having the extracted first and second events by the total number of the combinations; and determining from among the group of events and based on a judgment result obtained at the judging and the degree of reliability calculated at the calculating, an event that has occurred at an object that is a source-of-dependence object but not a dependent object, to be an event that is to be stored.

6. An information managing apparatus comprising:
a memory; and
a processor configured to execute a procedure, the procedure comprising:
    extracting from a group of events that have occurred at a group of objects under management and having dependence relations, combinations of a first event that has occurred at a source-of-dependence object and a second event that has occurred at a dependent object that is dependent on the source-of-dependence object;
    judging for each extracted combination, whether a dependence relation exists between the first event and the second event, by using the difference between the time of occurrence of the first event and that of the second event;
    calculating a degree of reliability by dividing the number of combinations having the extracted first and second events by the total number of the combinations by the total number of combinations; and
    determining from among the group of events and based on a judgment result obtained at the judging and the degree of reliability calculated at the calculating, an event that has occurred at an object that is a source-of-dependence object but not a dependent object, to be an event that is to be stored.

7. The computer-readable, non-transitory medium according to claim 3, wherein
the storing includes storing the calculated degree of reliability together with the event that is to be stored.

8. The information managing method according to claim 5, further comprising storing to a database, information related to the event to be stored.

9. The information managing apparatus according to claim 6, wherein the procedure further comprising storing to a database, information related to the event to be stored.

* * * * *